US011932017B2

(12) United States Patent
Takabe

(10) Patent No.: US 11,932,017 B2
(45) Date of Patent: Mar. 19, 2024

(54) LIQUID DISCHARGE HEAD, LIQUID DISCHARGE DEVICE, AND ACTUATOR

(71) Applicant: Seiko Epson Corporation, Tokyo (JP)

(72) Inventor: Motoki Takabe, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 30 days.

(21) Appl. No.: 17/509,873

(22) Filed: Oct. 25, 2021

(65) Prior Publication Data

US 2022/0126581 A1 Apr. 28, 2022

(30) Foreign Application Priority Data

Oct. 26, 2020 (JP) ................................ 2020-178710

(51) Int. Cl.
*B41J 2/14* (2006.01)

(52) U.S. Cl.
CPC .. *B41J 2/14233* (2013.01); *B41J 2002/14491* (2013.01); *B41J 2202/11* (2013.01)

(58) Field of Classification Search
None
See application file for complete search history.

(56) References Cited

U.S. PATENT DOCUMENTS

2016/0067967 A1 3/2016 Naganuma et al.
2016/0101621 A1* 4/2016 Naganuma ............ H01L 41/081 29/25.35

FOREIGN PATENT DOCUMENTS

JP 2016-058467 4/2016

* cited by examiner

*Primary Examiner* — Erica S Lin
(74) *Attorney, Agent, or Firm* — WORKMAN NYDEGGER

(57) ABSTRACT

A liquid discharge head includes a diaphragm, a first electrode, a piezoelectric body, and a second electrode which are stacked in this order in a first direction, in which when a region of the piezoelectric body interposed between the first electrode and the second electrode is set as a first region, a region of the piezoelectric body other than the first region is set as a second region, a portion of the diaphragm that overlaps a boundary between the first region and the second region when viewed in the first direction is set as a first portion, and a portion of the diaphragm that is different from the first portion and overlaps the first region when viewed in the first direction is set as a second portion, a thickness of the first portion is smaller than a thickness of the second portion.

15 Claims, 10 Drawing Sheets

LIQUID DISCHARGE HEAD, LIQUID DISCHARGE DEVICE, AND ACTUATOR

The present application is based on, and claims priority from JP Application Serial Number 2020-178710, filed Oct. 26, 2020, the disclosure of which is hereby incorporated by reference herein in its entirety.

BACKGROUND

1. Technical Field

The present disclosure relates to a liquid discharge head, a liquid discharge device, and an actuator.

2. Related Art

A liquid discharge device such as a piezo-type ink jet printer includes an actuator using a piezoelectric body. For example, the actuator unit described in JP-A-2016-58467 includes a diaphragm, a lower electrode layer, a piezoelectric layer, and an upper electrode layer, which are stacked in this order.

The actuator unit described in JP-A-2016-58467 includes a portion in which a piezoelectric layer is sandwiched between a lower electrode layer and an upper electrode layer, and a portion in which the piezoelectric layer is not sandwiched between the lower electrode layer and the upper electrode layer. At the boundary between these portions, one portion is deformed according to the electric field between the lower electrode layer and the upper electrode layer, whereas the other portion is hardly deformed by the electric field, and therefore stress is concentrated. In the related art, there is a problem that cracks are likely to occur in the piezoelectric layer due to the stress.

SUMMARY

According to an aspect of the present disclosure, there is provided a liquid discharge head including a diaphragm, a first electrode, a piezoelectric body, and a second electrode which are stacked in this order in a first direction, in which when a region of the piezoelectric body interposed between the first electrode and the second electrode is set as a first region, a region of the piezoelectric body other than the first region is set as a second region, a portion of the diaphragm that overlaps a boundary between the first region and the second region when viewed in the first direction is set as a first portion, and a portion of the diaphragm that is different from the first portion and overlaps the first region when viewed in the first direction is set as a second portion, a thickness of the first portion is smaller than a thickness of the second portion.

According to still another aspect of the present disclosure, there is provided a liquid discharge device including the liquid discharge head of the above-described embodiment, and a controller that controls a liquid discharge operation by the liquid discharge head.

According to still another aspect of the present disclosure, there is provided an actuator including a diaphragm, a first electrode, a piezoelectric body, and a second electrode which are stacked in this order in a first direction, in which when a region of the piezoelectric body interposed between the first electrode and the second electrode is set as a first region, a region of the piezoelectric body other than the first region is set as a second region, a portion of the diaphragm that overlaps a boundary between the first region and the second region when viewed in the first direction is set as a first portion, and a portion of the diaphragm that is different from the first portion and overlaps the first region when viewed in the first direction is set as a second portion, a thickness of the first portion is smaller than a thickness of the second portion.

DESCRIPTION OF EXEMPLARY EMBODIMENTS

Figure 1:
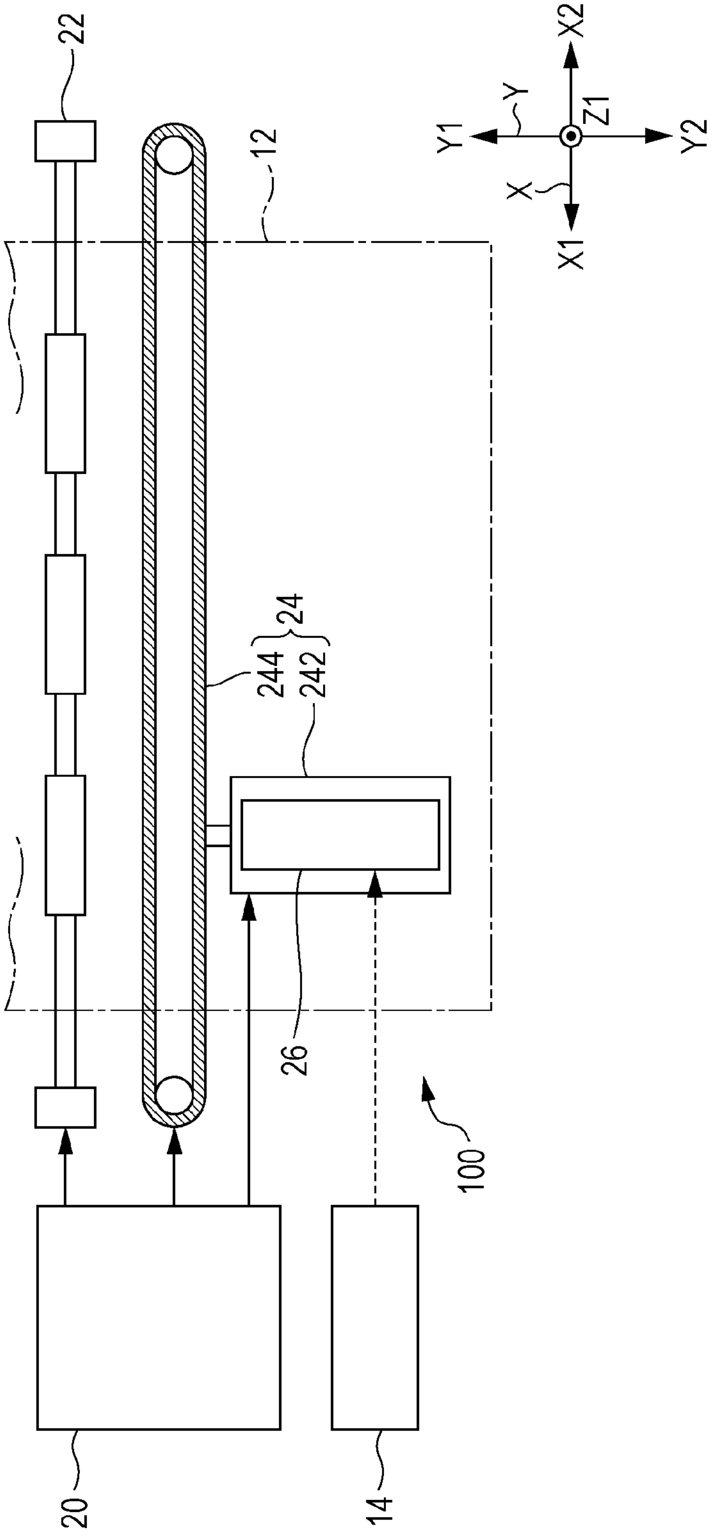
FIG. 1 is a configuration view schematically illustrating a liquid discharge device according to a first embodiment.

Hereinafter, preferred embodiments according to the present disclosure will be described with reference to the accompanying drawings. In the drawings, the dimensions or scales of each portion are appropriately different from the actual dimensions or scales, and some portions are schematically illustrated for easy understanding. The scope of the present disclosure is not limited to these embodiments unless otherwise particularly stated to limit the present disclosure in the following description.

The following description will be performed by using an X axis, a Y axis, and a Z axis that intersect each other as appropriate. One direction along the X axis is referred to as an X1 direction, and a direction opposite to the X1 direction is referred to as an X2 direction. Similarly, directions opposite to each other along the Y axis are referred to as a Y1 direction and a Y2 direction. Directions opposite to each other along the Z axis are referred to as a Z1 direction and a Z2 direction. The Z1 direction is an example of a "first direction". The Z2 direction is an example of a "second direction". Further, viewing in the direction along the Z axis is called "plan view".

Typically, the Z axis is a vertical axis, and the Z2 direction corresponds to a downward direction in a vertical direction.

The Z axis may not be a vertical axis. Although the X axis, the Y axis, and the Z axis are typically orthogonal to each other, the present disclosure is not limited thereto, and the axes may intersect at an angle within, for example, a range of 80° or more and 100° or less.

1. First Embodiment

1-1. Overall Configuration of Liquid Discharge Device

FIG. 1 is a configuration view schematically illustrating a liquid discharge device 100 according to a first embodiment. The liquid discharge device 100 is an ink jet printing device that discharges ink, which is an example of a liquid, as droplets onto a medium 12. The medium 12 is typically printing paper. The medium 12 is not limited to printing paper, and may be a printing target of any material such as a resin film or cloth.

As illustrated in FIG. 1, the liquid discharge device 100 is equipped with a liquid container 14 for storing ink. Specific embodiments of the liquid container 14 include, for example, a cartridge that can be attached to and detached from the liquid discharge device 100, a bag-shaped ink pack made of a flexible film, and an ink tank that can be refilled with ink. The type of ink stored in the liquid container 14 is arbitrary.

The liquid discharge device 100 includes a control unit 20, a transport mechanism 22, a moving mechanism 24, and a liquid discharge head 26. The control unit 20 includes, for example, a processing circuit such as a central processing unit (CPU) or a field programmable gate array (FPGA) and a storage circuit such as a semiconductor memory, and controls the operation of each element of the liquid discharge device 100. Here, the control unit 20 is an example of a "controller" and controls the ink discharge operation by the liquid discharge head 26.

The transport mechanism 22 transports the medium 12 in the Y2 direction under the control of the control unit 20. The moving mechanism 24 causes the liquid discharge head 26 to reciprocate in the X1 direction and the X2 direction under the control of the control unit 20. In the example illustrated in FIG. 1, the moving mechanism 24 includes a substantially box-shaped transport body 242 called a carriage for accommodating the liquid discharge head 26, and a transport belt 244 to which the transport body 242 is fixed. The number of liquid discharge heads 26 mounted on the transport body 242 is not limited to one, and may be a plurality. Further, in addition to the liquid discharge head 26, the above-mentioned liquid container 14 may be mounted on the transport body 242.

Under the control of the control unit 20, the liquid discharge head 26 discharges the ink supplied from the liquid container 14 from each of a plurality of nozzles toward the medium 12 in the Z2 direction. When the discharge is performed in parallel with the transport of the medium 12 by the transport mechanism 22 and the reciprocating movement of the liquid discharge head 26 by the moving mechanism 24, an image is formed with ink on the surface of the medium 12.

As described above, the liquid discharge device 100 includes the liquid discharge head 26 and the control unit 20 which is an example of a "controller" that controls the ink discharge operation by the liquid discharge head 26.

1-2. Overall Configuration of Liquid Discharge Head

Figure 2:
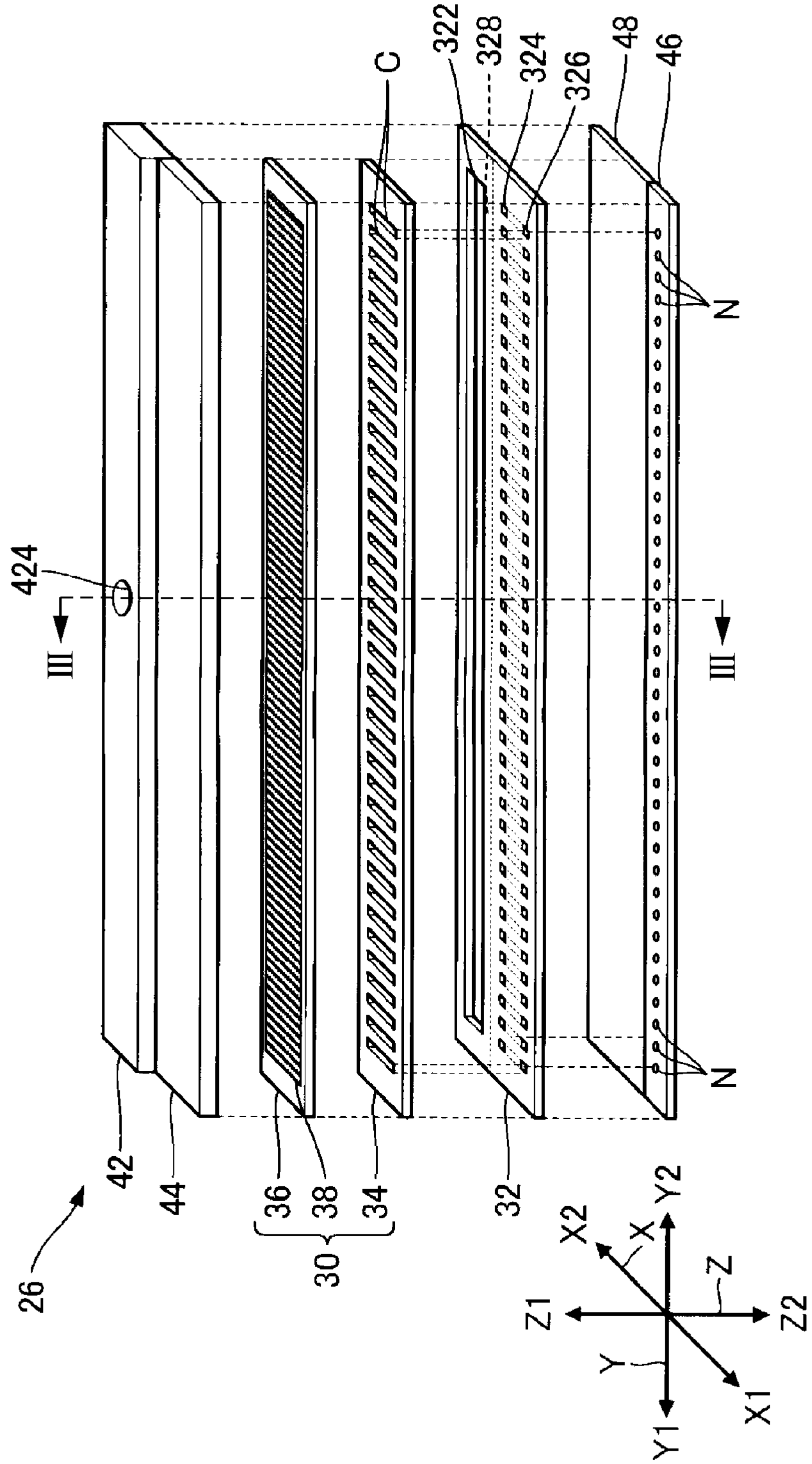
FIG. 2 is an exploded perspective view of a liquid discharge head according to the first embodiment.
Figure 3:
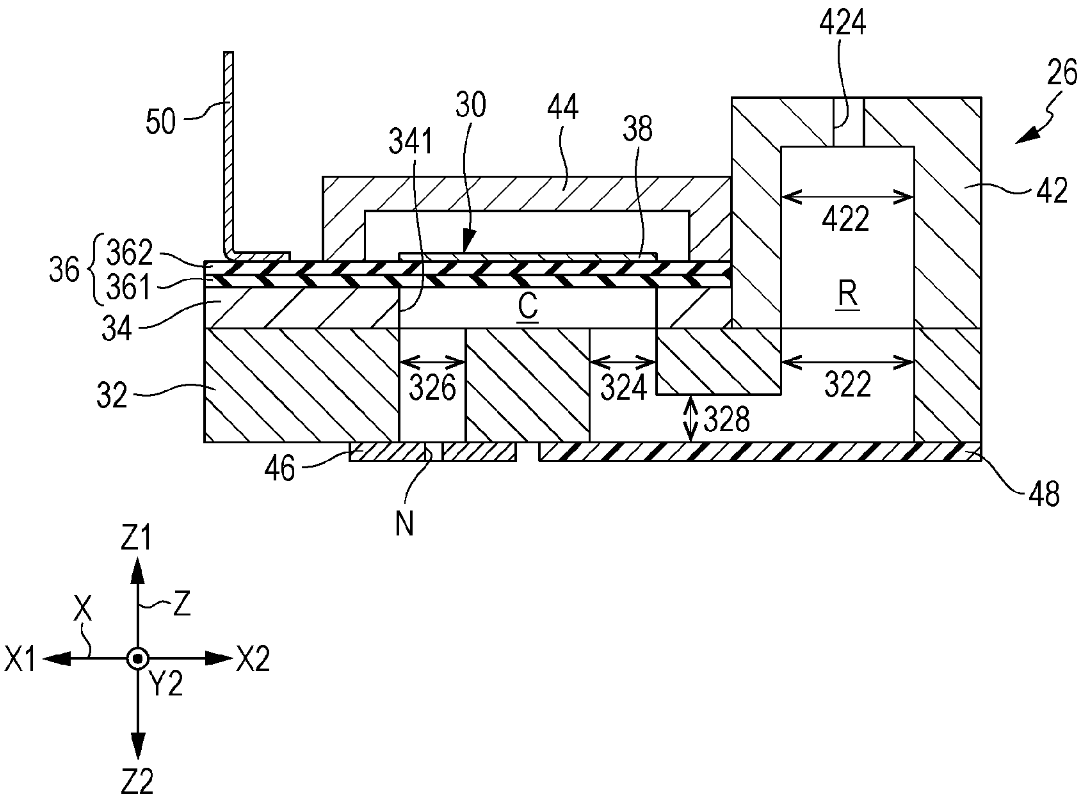
FIG. 3 is a cross-sectional view taken along the line III-III in FIG. 2.

FIG. 2 is an exploded perspective view of the liquid discharge head 26 according to the first embodiment. FIG. 3 is a cross-sectional view taken along the line III-III of FIG. 2. As illustrated in FIGS. 2 and 3, the liquid discharge head 26 includes a channel substrate 32, a pressure chamber substrate 34, a diaphragm 36, a plurality of piezoelectric elements 38, a housing portion 42, a sealing body 44, and a nozzle plate 46, a vibration absorber 48, and a wiring substrate 50. The actuator 30 includes a pressure chamber substrate 34, a diaphragm 36, and the plurality of piezoelectric elements 38.

Here, the pressure chamber substrate 34, the diaphragm 36, the plurality of piezoelectric elements 38, the housing portion 42, and the sealing body 44 are installed in a region located in the Z1 direction with respect to the channel substrate 32. On the other hand, the nozzle plate 46 and the vibration absorber 48 are installed in the region located in the Z2 direction with respect to the channel substrate 32. Each element of the liquid discharge head 26 is generally a plate-shaped member elongated in the Y direction, and is joined to each other by, for example, an adhesive.

As illustrated in FIG. 2, the nozzle plate 46 is a plate-shaped member provided with a plurality of nozzles N arrayed in a direction along the Y axis. Each nozzle N is a through hole through which ink passes. For example, the nozzle plate 46 is manufactured by processing a silicon single crystal substrate by a semiconductor manufacturing technology using a processing technique such as dry etching or wet etching. However, other known methods and materials may be appropriately used for manufacturing the nozzle plate 46.

The channel substrate 32 is a plate-shaped member for forming a channel for ink. As illustrated in FIGS. 2 and 3, the channel substrate 32 is provided with an opening 322, a plurality of supply channels 324, a plurality of communication channels 326, and a relay channel 328. The opening 322 is a long through hole extending in the direction along the Y axis in a plan view in the direction along the Z axis so as to be continuous over the plurality of nozzles N. On the other hand, each of the supply channel 324 and the communication channel 326 is a through hole individually provided for each nozzle N. As illustrated in FIG. 3, the relay channel 328 is provided on a surface of the channel substrate 32 facing the Z2 direction. The relay channel 328 is provided over the plurality of supply channels 324, and is a channel that allows the opening 322 and the plurality of supply channels 324 to communicate with each other. The channel substrate 32 is manufactured by processing a silicon single crystal substrate by, for example, a semiconductor manufacturing technique, similarly to the nozzle plate 46 described above. However, other known methods and materials may be appropriately used for manufacturing the channel substrate 32.

The pressure chamber substrate 34 is a plate-shaped member in which a plurality of pressure chambers C corresponding to the plurality of nozzles N are formed. The pressure chamber C is located between the channel substrate 32 and the diaphragm 36, and is a space called a cavity for applying pressure to the ink filled in the pressure chamber C. The plurality of pressure chambers C are arrayed in the direction along the Y axis. Each pressure chamber C includes holes 341 that open on both surfaces of the pressure chamber substrate 34, and has a long shape extending in the direction along the X axis. The end of each pressure chamber C in the X2 direction communicates with the corresponding supply channel 324. On the other hand, the end of each pressure chamber C in the X1 direction communicates with the corresponding communication channel 326. The pressure chamber substrate 34 is manufactured by processing a silicon single crystal substrate by, for example, a semiconductor manufacturing technique, similarly to the nozzle plate 46 described above. However, other known methods and materials may be appropriately used for manufacturing of the pressure chamber substrate 34.

The diaphragm 36 is disposed on a surface of the pressure chamber substrate 34 facing the Z1 direction. The diaphragm 36 is a plate-shaped member that can be elastically deformed. In the example illustrated in FIG. 3, the diaphragm 36 includes a first layer 361 which is an elastic film and a second layer 362 which is an insulating film, which are stacked in this order in the Z1 direction. The details of the diaphragm 36 will be described in 1-3 described later.

The plurality of piezoelectric elements 38 corresponding to different nozzles N or pressure chambers C are disposed on a surface of the diaphragm 36 facing the Z1 direction. Each piezoelectric element 38 is a passive element that is deformed by the supply of a drive signal, and has a long shape extending in a direction along the X axis. The plurality of piezoelectric elements 38 are arrayed in a direction along the Y axis so as to correspond to the plurality of pressure chambers C. When the diaphragm 36 vibrates in conjunction with the deformation of the piezoelectric element 38, the pressure in the pressure chamber C fluctuates, and ink is discharged from the nozzle N. The details of the piezoelectric element 38 will be described in 1-3.

The housing portion 42 is a case for storing ink supplied to the plurality of pressure chambers C, and is joined to a surface of the channel substrate 32 facing the Z1 direction with an adhesive or the like. The housing portion 42 is made of, for example, a resin material and is manufactured by injection molding. The housing portion 42 is provided with an accommodating portion 422 and an introduction port 424. The accommodating portion 422 is a concave portion having an outer shape corresponding to the opening 322 of the channel substrate 32. The introduction port 424 is a through hole communicating with the accommodating portion 422. The space provided by the opening 322 and the accommodating portion 422 functions as a liquid storage chamber R which is a reservoir for storing ink. Ink from the liquid container 14 is supplied to the liquid storage chamber R via the introduction port 424.

The vibration absorber 48 is an element for absorbing the pressure fluctuation in the liquid storage chamber R. The vibration absorber 48 is, for example, a compliance substrate which is a flexible sheet member that can be elastically deformed. Here, the vibration absorber 48 is disposed on the surface of the channel substrate 32 facing the Z2 direction so that the bottom surface of the liquid storage chamber R is formed by closing the opening 322 of the channel substrate 32, the relay channel 328, and the plurality of supply channels 324.

The sealing body 44 is a structure that protects the plurality of piezoelectric elements 38 and reinforces the mechanical strength of the pressure chamber substrate 34 and the diaphragm 36. The sealing body 44 is joined to the surface of the diaphragm 36 with, for example, an adhesive. The sealing body 44 is provided with a concave portion for accommodating the plurality of piezoelectric elements 38.

The wiring substrate 50 is joined to the surface of the pressure chamber substrate 34 or the diaphragm 36 facing the Z1 direction. The wiring substrate 50 is a mounting component on which a plurality of wirings for electrically couple the control unit 20 and the liquid discharge head 26 are formed. The wiring substrate 50 is, for example, a flexible wiring substrate such as a flexible printed circuit (FPC) or a flexible flat cable (FFC).

A drive signal for driving the piezoelectric element 38 is supplied to the wiring substrate 50. The drive signal is supplied to each piezoelectric element 38 via the wiring substrate 50.

1-3. Details of Actuator

Figure 4:
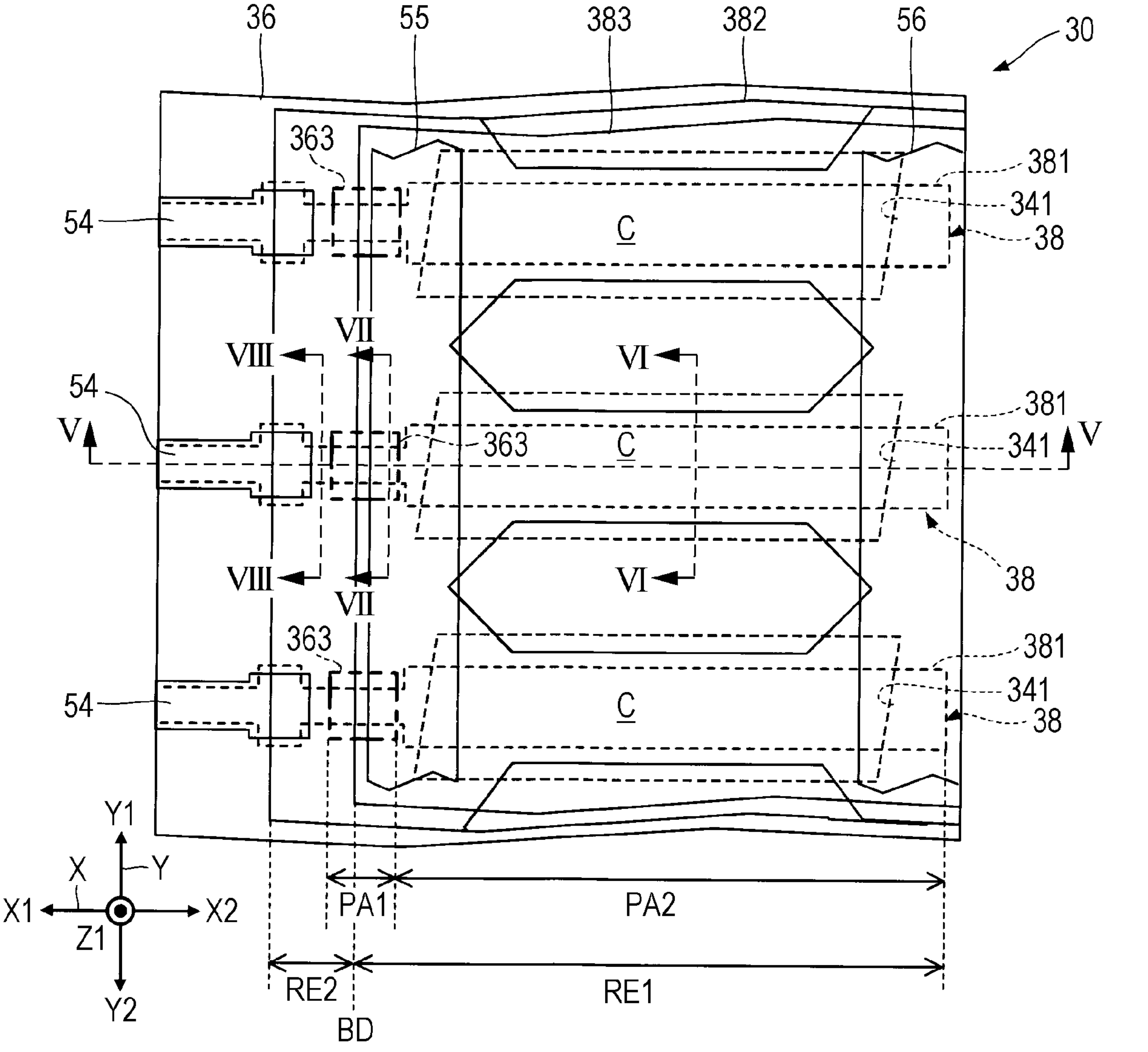
FIG. 4 is a plan view illustrating an actuator according to the first embodiment.
Figure 5:
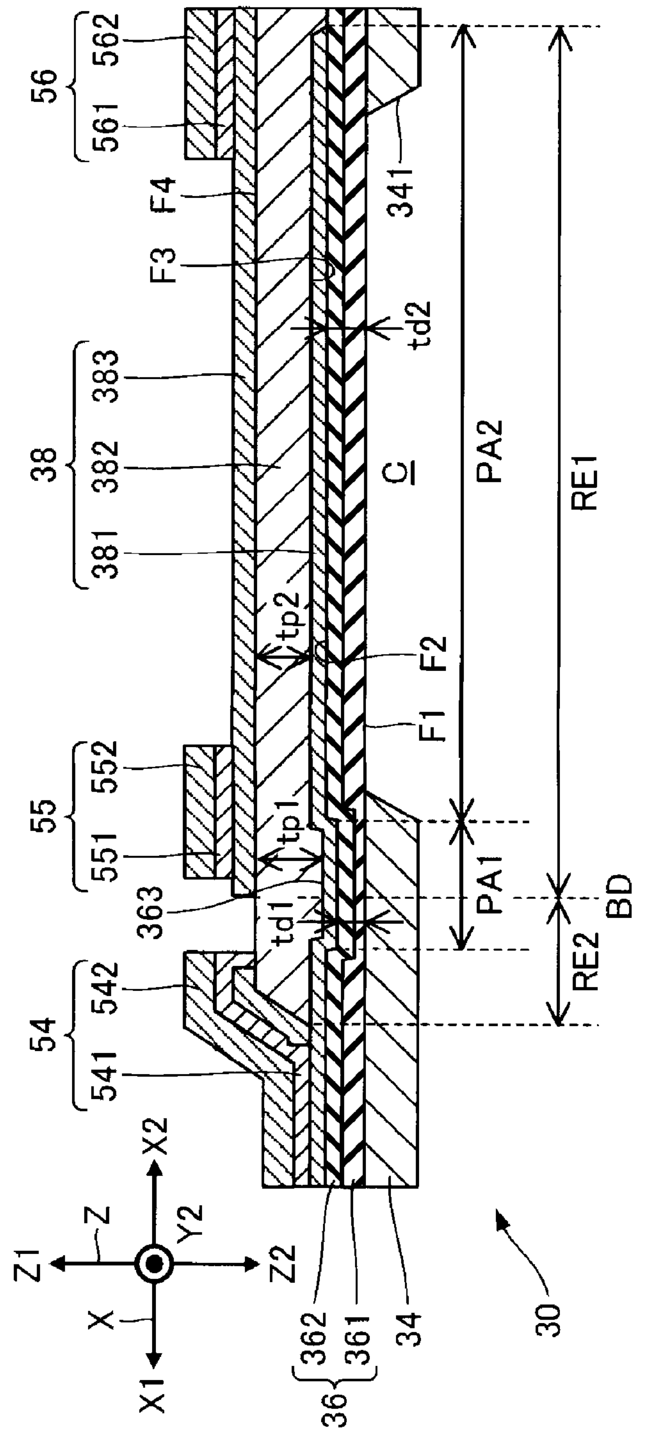
FIG. 5 is a cross-sectional view taken along the line V-V in FIG. 4.
Figure 6:
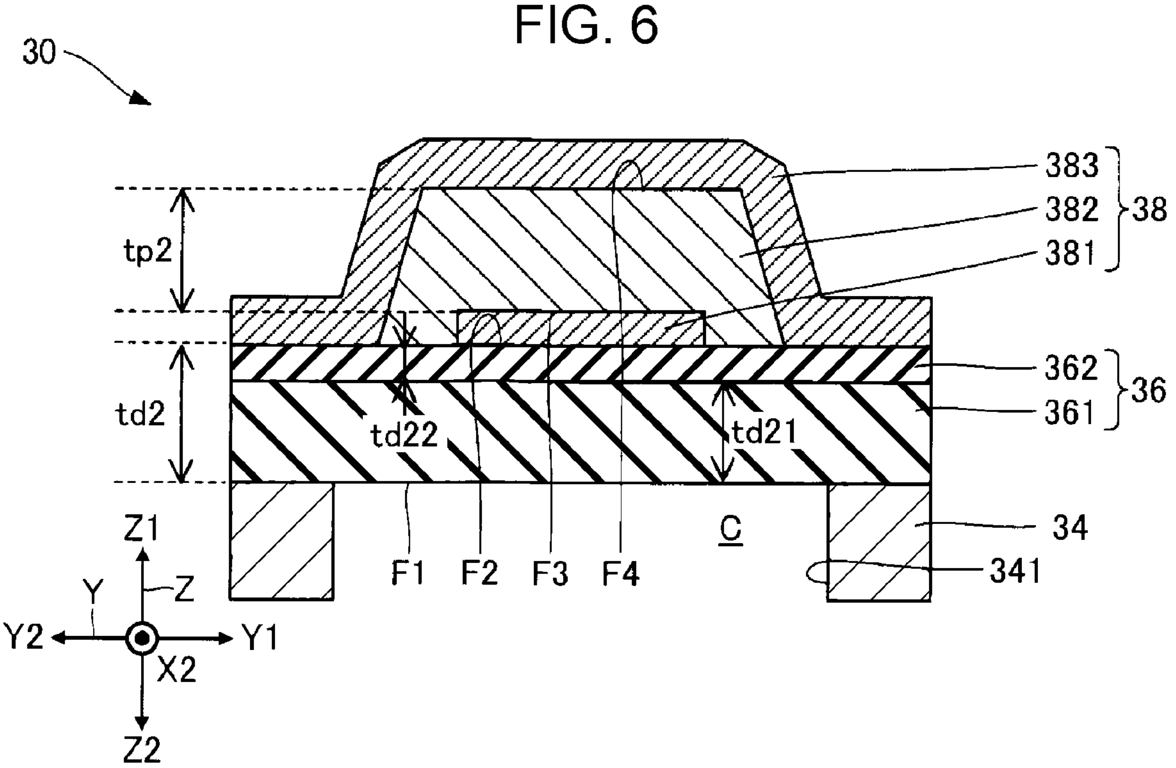
FIG. 6 is a cross-sectional view taken along the line VI-VI in FIG. 4.
Figure 7:
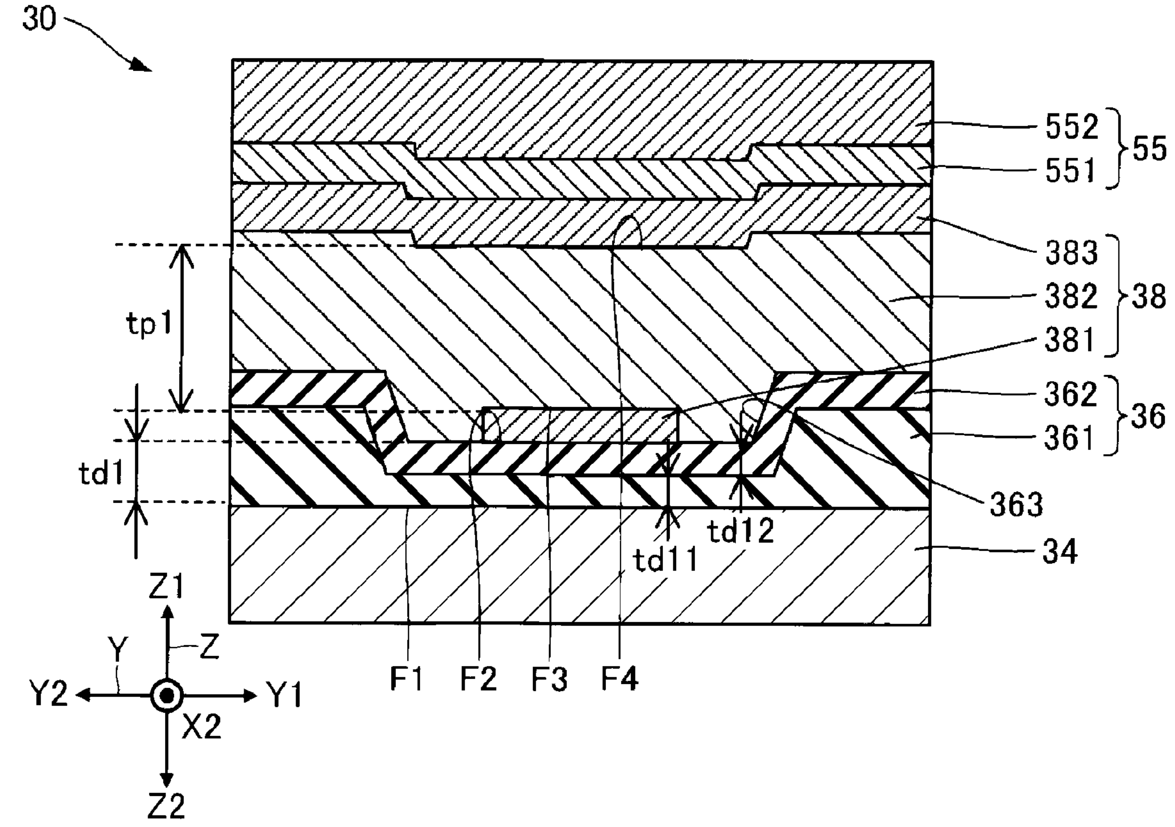
FIG. 7 is a cross-sectional view taken along the line VII-VII in FIG. 4.
Figure 8:
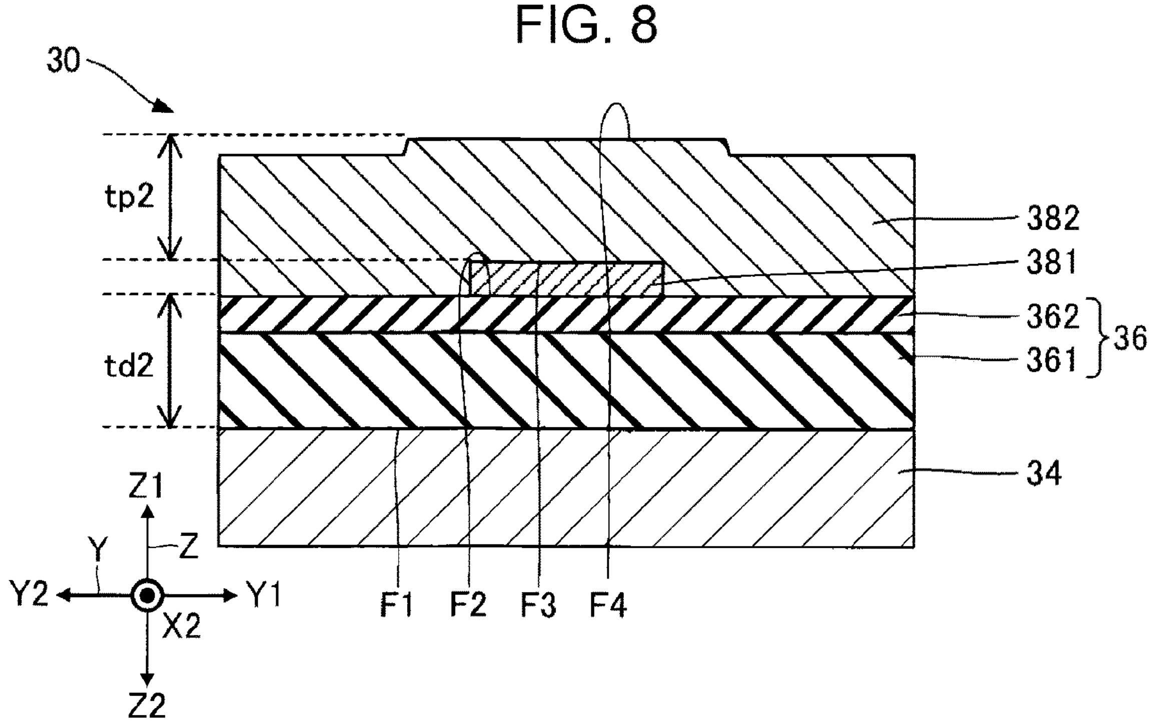
FIG. 8 is a cross-sectional view taken along the line VIII-VIII in FIG. 4.

FIG. 4 is a plan view illustrating the actuator 30 according to the first embodiment. FIG. 5 is a cross-sectional view taken along the line V-V in FIG. 4. FIG. 6 is a cross-sectional view taken along the line VI-VI in FIG. 4. FIG. 7 is a cross-sectional view taken along the line VII-VII in FIG. 4. FIG. 8 is a cross-sectional view taken along the line VIII-VIII in FIG. 4. In these views, the configuration of the actuator 30 is illustrated in more detail than in FIGS. 2 and 3 described above.

As illustrated in FIG. 5, the actuator 30 includes a wiring layer 54, a weight layer 55, and a weight layer 56 in addition to the pressure chamber substrate 34, the diaphragm 36, and the plurality of piezoelectric elements 38. Here, in the actuator 30, as described above, the pressure chamber substrate 34, the diaphragm 36, and the plurality of piezoelectric elements 38 are stacked in this order in the Z1 direction, the wiring layer 54, the weight layer 55, and the weight layer 56 are layers located most in the Z1 direction, which are obtained by the same film formation step.

As illustrated in FIGS. 4 and 5, the pressure chamber substrate 34 is provided with the holes 341 forming the pressure chamber C. In FIG. 4, the plan view shape of the hole 341 is illustrated by a broken line. The pressure chamber substrate 34 is formed, for example, by anisotropically etching a silicon single crystal substrate. For example, an aqueous potassium hydroxide solution (KOH) or the like is used as the etching solution for the anisotropic etching. Further, in the anisotropic etching, the first layer 361 of the diaphragm 36 is used as an etching stop layer.

In the example illustrated in FIG. 4, the plan view shape of the hole 341 is a parallelogram. Such a plan-view-shaped hole 341 is formed, for example, by anisotropically etching a silicon single crystal substrate having a plane orientation (110). The plan view shape of the hole 341 is not limited to the example illustrated in FIG. 4, and is arbitrary.

As illustrated in FIG. 5, the diaphragm 36 includes the first layer 361 and the second layer 362, which are stacked in this order in the Z1 direction. The first layer 361 is, for example, an elastic film made of silicon oxide ($SiO_2$). The elastic film is formed, for example, by thermally oxidizing one surface of a silicon single crystal substrate. The second layer 362 is, for example, an insulating film made of zirconium oxide ($ZrO_2$). The insulating film is formed by, for example, forming a zirconium layer by a sputtering method and thermally oxidizing the layer.

The first layer 361 is not limited to silicon oxide, and may be made of other elastic material such as silicon alone. The constituent material of the second layer 362 is not limited to zirconium oxide, and may be another insulating material such as silicon nitride. Further, another layer such as a metal oxide may be interposed between the first layer 361 and the second layer 362. In other words, the first layer 361 or the second layer 362 may include a plurality of layers that are the same as or different from each other. Further, a part or all of the diaphragm 36 may be integrally made of the same material as the pressure chamber substrate 34. Further, the diaphragm 36 may include a layer of a single material.

As illustrated in FIG. 5, the diaphragm 36 having the above basic configuration includes a first portion PA1 having a thickness of td1 and a second portion PA2 having a thickness of td2 that is thicker than the thickness td1 as portions located in different regions in a plan view. Here, the diaphragm 36 includes a first surface F1 and a second surface F2, and the first portion PA1 is formed by providing a partially concave portion 363 on the second surface F2. The first surface F1 is a surface of the diaphragm 36 facing the Z2 direction. The second surface F2 is a surface of the diaphragm 36 facing the Z1 direction.

In the present embodiment, the first portion PA1 is configured by partially reducing the thickness of the first layer 361. That is, the first layer 361 includes a portion having a thickness of td11 and a portion having a thickness of td21 that is thicker than the thickness td11. The first layer 361 having such a portion having the thickness of td11 is obtained by, for example, removing a part of one surface of the elastic film formed by thermal oxidation as described above by etching with hydrofluoric acid, ion milling, or the like.

On the other hand, in the present embodiment, the thickness of the second layer 362 is uniform. Therefore, the thickness td12 of the second layer 362 of the first portion PA1 and the thickness td22 of the second layer 362 of the second portion PA2 are equal to each other. If the diaphragm 36 can be provided with the first portion PA1 and the second portion PA2, the thickness of the second layer 362 does not have to be uniform.

The first portion PA1 is a portion of the diaphragm 36 that overlaps the boundary BD between the first region RE1 and the second region RE2, which will be described later, of the piezoelectric body 382 in a plan view. The first portion PA1 is disposed at a position that does not overlap the pressure chamber C in a plan view.

In the present embodiment, as illustrated by the alternate long and two short dashes line in FIG. 4, the first portion PA1 is divided into each first electrode 381 and includes a plurality of portions arranged along the Y axis. As in the fifth embodiment described later, the first portion PA1 may include one portion common to the plurality of first electrodes 381, but if the piezoelectric body 382 is formed by using the sol-gel method or the metal organic decomposition (MOD) method when the first portion PA1 includes the plurality of portions, there is an advantage that the thickness tp1 of the portion of the piezoelectric body 382 corresponding to the first portion PA1 can be easily increased.

The second portion PA2 is a portion of the diaphragm 36 that is different from the first portion PA1 and overlaps the first region RE1 of the piezoelectric body 382 in a plan view. The second portion PA2 is disposed over a range including the pressure chamber C in a plan view. The second portion PA2 may be a part within the range illustrated in FIGS. 4 and 5.

As illustrated in FIG. 4, the piezoelectric element 38 overlaps the pressure chamber C in a plan view. As illustrated in FIG. 5, the piezoelectric element 38 includes the first electrode 381, the piezoelectric body 382, and the second electrode 383, which are stacked in this order in the Z1 direction.

Other layers such as a layer for enhancing adhesion may be appropriately interposed between the layers of the piezoelectric element 38 or between the piezoelectric element 38 and the diaphragm 36. Further, a seed layer may be provided between the first electrode 381 and the piezoelectric body 382. The seed layer has a function of improving the orientation of the piezoelectric body 382 when forming the piezoelectric body 382. The seed layer is made of, for example, titanium (Ti) or a composite oxide having a perovskite structure such as Pb(Fe, Ti)$O_3$. When the seed layer is made of titanium, when the piezoelectric body 382 is formed, the island-shaped Ti becomes crystal nuclei to improve the orientation of the piezoelectric body 382. In this case, the seed layer is formed to have a thickness of about 3 nm or more and 20 nm or less by, for example, a known film forming technique such as a sputtering method and a known processing technique using photolithography and etching. Further, when the seed layer is made of the composite oxide, the orientation of the piezoelectric body 382 is improved because the piezoelectric body 382 is affected by the crystal structure of a seed layer 444 when the piezoelectric body 382 is formed. In this case, the seed layer is formed by forming a precursor layer of a composite oxide by, for example, a sol-gel method or a metal organic decomposition (MOD) method, and firing and crystallizing the precursor layer.

The first electrodes 381 are individual electrodes disposed so as to be separated from each other for each piezoelectric element 38. Specifically, a plurality of first electrodes 381 extending in the direction along the X axis are arrayed in the direction along the Y axis at intervals from each other. A drive signal for discharging ink from the nozzle N corresponding to the piezoelectric element 38 is applied to the first electrode 381 of each piezoelectric element 38 via the wiring substrate 50.

The first electrode 381 includes, for example, a first layer made of titanium (Ti), a second layer made of platinum (Pt), and a third layer made of iridium (Ir), which are stacked in this order in the Z1 direction. The first electrode 381 is formed by, for example, a known film forming technique such as a sputtering method, and a known processing technique using photolithography, etching, or the like.

Here, the above-mentioned first layer functions as an adhesion layer for improving the adhesion of the first electrode 381 to the diaphragm 36. The thickness of the first layer is not particularly limited, and is, for example, about 3 nm or more and 50 nm or less. The constituent material of the first layer is not limited to titanium, and for example, chromium may be used instead of titanium.

Further, the metals constituting the second layer and the third layer described above are both electrode materials having excellent conductivity, and have similar chemical properties to each other. Therefore, the characteristics of the first electrode 381 as an electrode can be made excellent. The thickness of the second layer is not particularly limited, and is, for example, about 50 nm or more and 200 nm or less. The thickness of the third layer is not particularly limited, and is, for example, about 4 nm or more and 20 nm or less.

The configuration of the first electrode 381 is not limited to the above-mentioned example. For example, either the above-mentioned second layer or the third layer may be omitted, or a layer made of iridium may be further provided between the above-mentioned first layer and the second layer. Further, instead of the second layer and the third layer, or in addition to the second layer and the third layer, a layer made of an electrode material other than iridium and platinum may be used. Examples of the electrode material include metal materials such as aluminum (Al), nickel (Ni), gold (Au), and copper (Cu), and among these materials, one type may be used alone, or two or more types may be used in combination in the form of a stack or an alloy.

The first electrode 381 is pulled out from the piezoelectric body 382 at a position in the X1 direction, and the wiring layer 54 is coupled to the first electrode 381. The wiring layer 54 is a conductive film extending from the piezoelectric element 38 in the X1 direction for each first electrode 381, and functions as a wiring for coupling the first electrode 381 and the wiring substrate 50. In the example illustrated in FIG. 5, the wiring layer 54 includes a layer 541 and a layer 542, which are stacked in this order in the Z1 direction. The layer 541 is a layer for enhancing the adhesion between the wiring layer 54 and the piezoelectric element 38, and is made of, for example, a nickel-chromium alloy. The layer 542 is a layer for increasing the conductivity of the wiring layer 54, and is made of, for example, gold (Au).

The piezoelectric body 382 is disposed between the first electrode 381 and the second electrode 383. The piezoelectric body 382 has a band shape extending in the direction along the Y axis so as to be continuous over the plurality of piezoelectric elements 38. In the example illustrated in FIG. 4, the piezoelectric body 382 is provided with a through hole 443*a* penetrating the piezoelectric body 382 extending in the direction along the X axis in a region corresponding to the gap between the pressure chambers C adjacent to each other in a plan view. The piezoelectric body 382 may be individually provided on the plurality of piezoelectric elements 38.

The piezoelectric body 382 is made of a piezoelectric material having a perovskite-type crystal structure represented by the general composition formula $ABO_3$. Examples of the piezoelectric material include, lead titanate ($PbTIO_3$), lead zirconate titanate ($Pb(Zr, Ti)O_3$), lead zirconate ($PbZrO_3$), lead titanate lantern ($(Pb, La), TiO_3$), lead zirconate titanate lantern ($(Pb, La) (Zr, Ti)O_3$), lead zirconium titanate niobate ($Pb(Pb) Zr, Ti, Nb) O_3$), lead magnesium niobate zirconium titanate ($Pb(Zr, Ti) (Mg, Nb)O_3$), and the like. Among these materials, lead zirconate titanate is preferably used as a constituent material of the piezoelectric body 382. The piezoelectric body 382 may contain a small amount of other elements such as impurities. Further, the piezoelectric material constituting the piezoelectric body 382 may be a lead-free material such as barium titanate.

The piezoelectric body 382 is formed by forming a precursor layer of the piezoelectric body by, for example, a liquid phase method such as a sol-gel method or a metal organic decomposition (MOD) method, and firing and crystallizing the precursor layer. Here, the piezoelectric body 382 may include a single layer, but when including a plurality of layers, there is an advantage that the characteristics of the piezoelectric body 382 can be easily improved even if the thickness of the piezoelectric body 382 is increased.

The second electrode 383 is a band-shaped common electrode extending in the direction along the Y axis so as to be continuous over the plurality of piezoelectric elements 38. A predetermined reference voltage is applied to the second electrode 383.

The second electrode 383 includes, for example, a layer made of iridium (Ir) and a layer made of titanium (Ti), which are stacked in the Z1 direction in this order. The second electrode 383 is formed by, for example, a known film forming technique such as a sputtering method, and a known processing technique using photolithography, etching, or the like.

The constituent material of the second electrode 383 is not limited to iridium and titanium, and may be metal materials such as platinum (Pt), aluminum (Al), nickel (Ni), gold (Au), and copper (Cu). Further, the second electrode 383 may be configured by using one of these metal materials alone, or may be configured by using two or more of these metal materials in combination in the form of a stack, an alloy, or the like. Further, the second electrode 383 may include a single layer. However, the second electrode 383 preferably contains iridium or iridium oxide having a lower oxygen content than the stoichiometric composition.

The weight layer 55 and the weight layer 56 are disposed on the second electrode 383. The weight layer 55 and the weight layer 56 are weights for suppressing unnecessary vibration of the diaphragm 36. Specifically, the weight layer 55 is a band-shaped conductive film extending along the Y axis along the edge of the second electrode 383 in the X1 direction. In the example illustrated in FIG. 5, the weight layer 55 includes a layer 551 obtained by the same film formation step as the layer 541 and a layer 552 obtained by the same film formation step as the layer 542, which are stacked in this order in the Z1 direction. The weight layer 56 is a band-shaped conductive film extending along the Y axis along the edge of the second electrode 383 in the X2 direction. In the example illustrated in FIG. 5, the weight layer 55 includes a layer 551 obtained by the same film formation step as the layer 541 and a layer 552 obtained by the same film formation step as the layer 542, which are stacked in this order in the Z1 direction.

In the piezoelectric element 38 having the above basic configuration, the piezoelectric body 382 includes a first region RE1 interposed between the first electrode 381 and the second electrode 383, and a second region RE2 other than the first region RE1. In other words, the first region RE1 is a region in which the piezoelectric body 382 is sandwiched between the first electrode 381 and the second electrode 383 in the direction along the Z axis. Further, the second region RE2 is a region in which the piezoelectric body 382 is not sandwiched between the first electrode 381 and the second electrode 383 in the direction along the Z axis.

Here, the length of each of the first electrode 381, the piezoelectric body 382, and the second electrode 383 along the X axis is longer than the length of the pressure chamber C along the X axis, and the ends of the first electrode 381, the piezoelectric body 382, and the second electrode 383 in the X1 and X2 directions, respectively, are located outside the pressure chamber C in a plan view.

In particular, since the end of the first electrode 381 in the X1 direction needs to be coupled to the wiring substrate 50 described above, the end of the first electrode 381 is located in the X1 direction with respect to the end of the piezoelectric body 382 in the X1 direction. Further, since it is necessary to secure the insulating property between the first electrode 381 and the second electrode 383, the end of the piezoelectric body 382 in the X1 direction is located in the X1 direction with respect to the end of the second electrode 383 in the X1 direction. Further, since it is necessary to apply an electric field to the piezoelectric body 382 over the entire region of the pressure chamber C in the direction along the X axis, the end of the second electrode 383 in the X1 direction is located in the X1 direction with respect to the end of the pressure chamber C in the X1 direction. From the positional relationship of the ends in the X1 direction, a boundary BD between the first region RE1 and the second region RE2 is located at a portion of the piezoelectric body 382 that is constrained by deformation due to joining with the pressure chamber substrate 34 via the diaphragm 36.

In the actuator 30, as described above, when the diaphragm 36 includes the first portion PA1 and the second portion PA2, the neutral axis of the stack including the diaphragm 36 and the piezoelectric body 382 is partially shifted toward the piezoelectric body 382, and therefore the stress concentration generated at the boundary BD between the first region RE1 and the second region RE2 is reduced.

Moreover, since the diaphragm 36 includes the first portion PA1 and the second portion PA2, the thickness tp1 of the portion of the piezoelectric body 382 corresponding to the first portion PA1 is larger than the thickness tp2 of the portion of the piezoelectric body 382 corresponding to the second portion PA2. Therefore, the portion of the piezoelectric body 382 corresponding to the first portion PA1 is less likely to be deformed by the electric field applied between the first electrode 381 and the second electrode 383, as compared with the portion of the piezoelectric body 382 corresponding to the second portion PA2. As a result, the stress concentration on the boundary BD is reduced. Further, the portion of the piezoelectric body 382 corresponding to the first portion PA1 has higher rigidity than the portion of the piezoelectric body 382 corresponding to the second portion PA2, and therefore has excellent mechanical strength. Therefore, even if the stress is concentrated on the boundary BD, cracks are unlikely to occur in the piezoelectric body 382.

Here, the portion of the piezoelectric body 382 corresponding to the first portion PA1 is a portion of the piezoelectric body 382 that overlaps the first portion PA1 in a plan view. Similarly, the portion of the piezoelectric body 382 corresponding to the second portion PA2 is the portion of the piezoelectric body 382 that overlaps the second portion PA2 in a plan view. Further, the piezoelectric body 382 includes a third surface F3 and a fourth surface F4, and the third surface F3 is provided with a convex portion having a shape complementary to the concave portion 363 formed on the second surface F2 of the first portion PA1. That is, the portion of the third surface F3 corresponding to the first portion PA1 is located in the Z2 direction with respect to the portion of the third surface F3 corresponding to the second portion PA2. The convex portion realizes the above-mentioned relationship between the thickness tp1 and the thickness tp2. The third surface F3 is a surface of the piezoelectric body 382 facing the Z2 direction. The fourth surface F4 is a surface of the piezoelectric body 382 facing the Z1 direction.

In the present embodiment, as illustrated in FIG. 7, the fourth surface F4 is provided with a concave portion shallower than the concave portion 363 in a region overlapping the concave portion 363 formed on the second surface F2 of the first portion PA1 in a plan view. That is, the portion of the fourth surface F4 corresponding to the first portion PA1 is located in the Z2 direction with respect to the portion of the fourth surface F4 corresponding to the second portion PA2. By forming the concave portion on the fourth surface F4 in this way, the adhesive strength of an adhesive for joining the member such as the sealing body 44 and the fourth surface F4 can be enhanced. The fourth surface F4 does not have to include the above-mentioned concave portion, and may be, for example, a substantially flat surface.

The difference between the thickness tp1 of the first portion PA1 and the thickness tp2 of the second portion PA2 is not particularly limited, and in the present embodiment, is smaller than the thickness of the diaphragm 36, and more specifically, is smaller than the thickness of the first layer 361. Since the difference is smaller than the thickness of the diaphragm 36, the difference can be realized by using the concave portion formed in the second surface F2 of the diaphragm 36. Further, since the difference is smaller than the thickness of the first layer 361, the difference can be realized by processing only the first layer 361. Since the concave portion formed on the fourth surface F4 is very small, the difference is substantially equal to the depth of the concave portion 363 formed on the second surface F2 of the diaphragm 36.

The difference in thickness between the first portion PA1 and the second portion PA2 described above is realized by the liquid forming the precursor layer of the piezoelectric body spreading along the second surface F2 of the diaphragm 36, for example, when forming the piezoelectric body 382 by using a liquid phase method such as a sol-gel method or a metal organic decomposition (MOD) method as described above.

Figure 9:
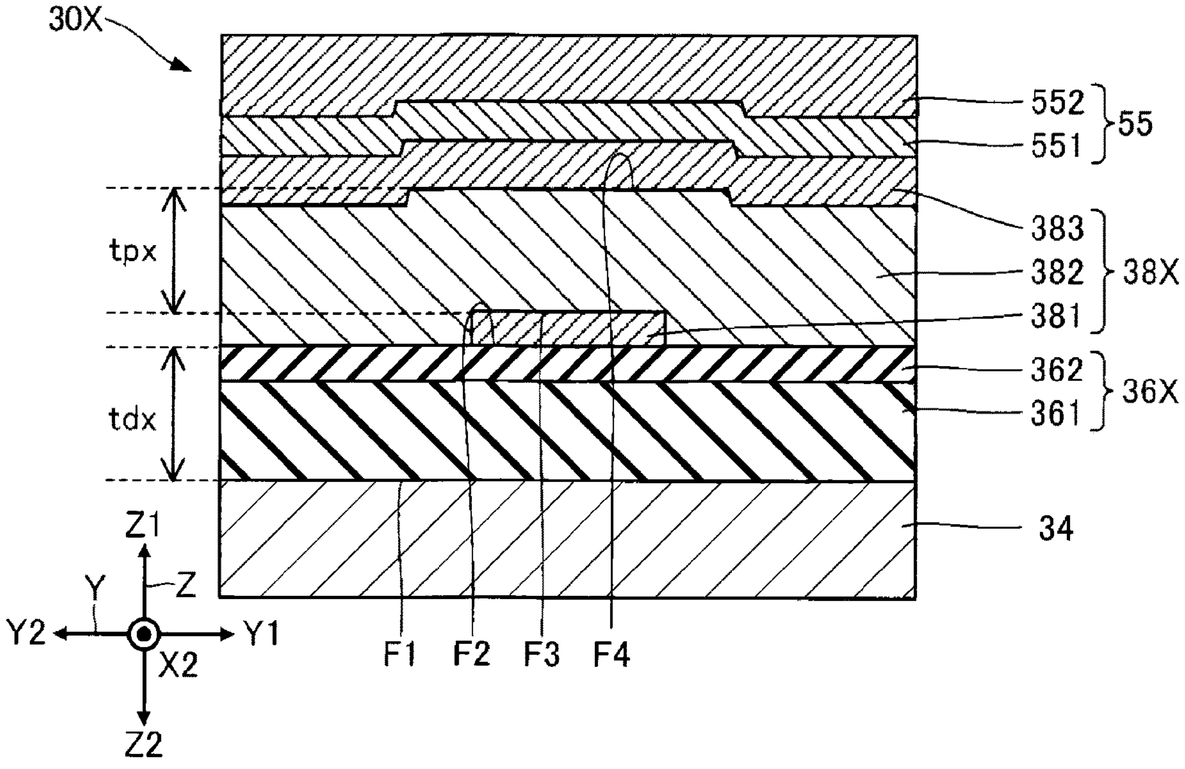
FIG. 9 is a cross-sectional view of an actuator in a comparative embodiment cut at a first portion of a diaphragm.

FIG. 9 is a cross-sectional view illustrating an actuator 30X in a comparative embodiment with respect to the present embodiment. In FIG. 9, the actuator 30X is illustrated in the cross section corresponding to FIG. 7. A thickness tdx of a diaphragm 36X included in the actuator 30X is constant. Therefore, if the piezoelectric body 382X is formed on the diaphragm 36X by a liquid phase method such as a sol-gel method or a metal organic decomposition (MOD) method, when the liquid forming the precursor layer of the piezoelectric body spreads along the second surface F2 of the diaphragm 36X, due to the thickness of the first electrode 381, a thickness tpx of the piezoelectric body 382X becomes partially small. In order to suppress the piezoelectric body 382 from becoming thin in this way, the difference between the thickness tp1 of the first portion PA1 and the thickness tp2 of the second portion PA2 is preferably larger than the thickness of the first electrode 381.

As described above, the liquid discharge head 26 includes the actuator 30. In the actuator 30, as described above, the diaphragm 36, the first electrode 381, the piezoelectric body 382, and the second electrode 383 are stacked in this order in the Z1 direction, which is an example of the "first direction".

In particular, the thickness td1 of the first portion PA1 of the diaphragm 36 is smaller than the thickness td2 of the second portion PA2 of the diaphragm 36. Here, the first portion PA1 is a portion of the diaphragm 36 that overlaps the boundary BD between the first region RE1 and the second region RE2 of the piezoelectric body 382 when viewed in the Z1 direction. The second portion PA2 is a portion of the diaphragm 36 that is different from the first portion PA1. The first region RE1 is a region of the piezoelectric body 382 interposed between the first electrode 381 and the second electrode 383. The second region RE2 is a region of the piezoelectric body 382 other than the first region RE1.

In the actuator 30 or the liquid discharge head 26 described above, since the thickness td1 of the first portion PA1 is smaller than the thickness td2 of the second portion PA2, the neutral axis of the stack including the first portion PA1 and the piezoelectric body 382 can be brought closer to the piezoelectric body 382 as compared with the configuration in which the thickness td1 is the thickness td2 or more. Therefore, the stress generated in the piezoelectric body 382 of the stack can be reduced as compared with the configuration in which the thickness td1 is the thickness td2 or more. As a result, cracks at the boundary BD of the piezoelectric body 382 can be reduced.

Here, as described above, the diaphragm 36 includes the first surface F1 and the second surface F2 located in the Z1 direction with respect to the first surface F1 and opposite to the first surface F1. The second surface F2 of the first portion PA1 is located in the Z2 direction, which is an example of the "second direction opposite to the first direction", with respect to the second surface F2 of the second portion PA2. In other words, on the second surface F2, the first portion PA1 is provided with the concave portion 363 that is recessed from the second portion PA2. Therefore, the thickness td1 of the first portion PA1 can be made smaller than the thickness td2 of the second portion PA2.

By also locating the first surface F1 of the first portion PA1 in the Z1 direction with respect to the first surface F1 of the second portion PA2, the thickness td1 of the first portion PA1 can be made smaller than the thickness td2 of the second portion PA2. However, in this case, the diaphragm 36 is not easy to manufacture as compared with the case where the second surface F2 of the first portion PA1 is located in the Z2 direction with respect to the second surface F2 of the second portion PA2.

Further, as described above, the diaphragm 36 include the first layer 361 and the second layer 362 located in the Z1 direction with respect to the first layer 361. The thickness td11 of the first layer 361 of the first portion PA1 is smaller than the thickness td21 of the first layer 361 of the second portion PA2. Therefore, even if the thickness of the second layer 362 is uniform, the thickness td1 of the first portion PA1 can be made smaller than the thickness td2 of the second portion PA2. Further, the angle formed by the step formed in the first layer 361 due to the difference between the thickness td11 and the thickness td21 is alleviated by being covered by the second layer 362. As a result, the stress concentration on the piezoelectric body 382 due to the angle can be reduced.

In the present embodiment, as described above, the thickness of the second layer 362 is uniform. Therefore, the thickness td12 of the second layer 362 of the first portion PA1 is equal to the thickness td22 of the second layer 362 of the second portion PA2. Therefore, processing such as etching is unnecessary on the second layer 362. Further, as compared with the configuration in which the thickness td12 is different from the thickness td22, the angle due to the step formed in the second layer 362 can be reduced. Here, "equal" is a concept that includes not only the case of being exactly equal but also the case of having a difference of about a manufacturing error.

Further, as described above, the thickness tp1 of the portion of the piezoelectric body 382 corresponding to the first portion PA1 is larger than the thickness tp2 of the portion of the piezoelectric body 382 corresponding to the second portion PA2. Therefore, the distance between the first electrode 381 and the second electrode 383 that sandwich the portion of the piezoelectric body 382 corresponding to the first portion PA1 is larger than the distance between the first electrode 381 and the second electrode 383 that sandwich the portion of the piezoelectric body 382 corresponding to the second portion PA2. Therefore, when an electric field is applied between the first electrode 381 and the second electrode 383, the deformation of the portion of the piezoelectric body 382 corresponding to the first portion PA1 can be made smaller than the deformation of the portion of the piezoelectric body 382 corresponding to the second portion PA2. As a result, cracks at the boundary BD between the first region RE1 and the second region RE2 of the piezoelectric body 382 can be suitably reduced.

Further, as described above, the piezoelectric body 382 includes the third surface F3, and the fourth surface F4 located in the Z1 direction with respect to the third surface F3 and opposite to the third surface F3. The portion of the third surface F3 corresponding to the first portion PA1 is located in the Z2 direction, which is an example of the "second direction opposite to the first direction", with respect to the portion of the third surface F3 corresponding to the second portion PA2. Therefore, even if the fourth surface F4 is a flat surface or an almost flat surface, the thickness tp1 of the portion of the piezoelectric body 382 corresponding to the first portion PA1 can be made larger than the thickness tp2 of the portion of the piezoelectric body 382 corresponding to the second portion PA2.

In the present embodiment, as described above, the portion of the fourth surface F4 corresponding to the first portion PA1 is located in the Z2 direction with respect to the portion of the fourth surface F4 corresponding to the second portion PA2. That is, on the fourth surface F4, the portion corresponding to the first portion PA1 is provided with a concave portion that is recessed from the portion corresponding to the second portion PA2. The concave portion enhances the adhesive strength of the adhesive when, for example, a member such as the sealing body 44 described above is joined to the fourth surface F4 with an adhesive. The fourth surface F4 may be a flat surface having substantially no unevenness.

As described above, the liquid discharge head 26 or the actuator 30 includes the pressure chamber substrate 34 located in the Z2 direction opposite to the Z1 direction with respect to the diaphragm 36 and partitioning the plurality of pressure chambers C to be arrayed. Then, the first portion PA1 and the second portion PA2 are adjacent to each other in the X1 direction or the X2 direction which is a direction intersecting the Y1 direction or the Y2 direction which is the array direction of the plurality of pressure chambers C.

In the present embodiment, as described above, the first electrode 381 is individually provided for the plurality of pressure chambers C. On the other hand, the second electrode 383 is commonly provided for the plurality of pressure chambers C. Here, in each of the X1 direction and the X2 direction, the respective ends of the first electrode 381 and the second electrode 383 are located outside the pressure chamber C. Further, the end of the first electrode 381 in the X1 direction is located in the X1 direction with respect to the end of the second electrode 383 in the X1 direction. Therefore, the boundary BD overlaps the portion of the pressure chamber substrate 34 without the pressure chamber C in a plan view. In other words, the boundary BD does not overlap the pressure chamber C in a plan view. Therefore, the deformation difference between the first region RE1 and the second region RE2 of the piezoelectric body 382 can be reduced as compared with the configuration in which the boundary BD overlaps the pressure chamber C in a plan view. From this point of view, as described above, the first portion PA1 does not overlap the pressure chamber C when viewed in the X1 direction.

2. Second Embodiment

Hereinafter, a second embodiment of the present disclosure will be described. For the elements whose actions and functions are the same as those of the first embodiment in the embodiments illustrated below, the reference numerals used in the description of the first embodiment will be diverted and detailed description of each will be omitted as appropriate.

Figure 10:
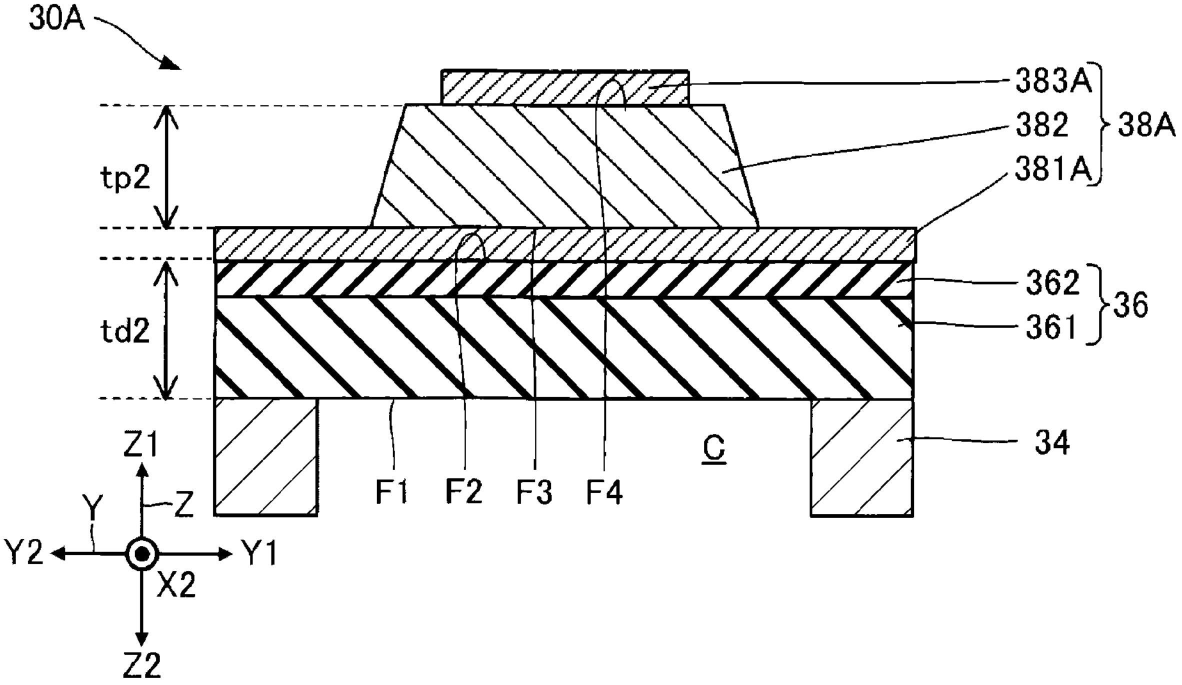
FIG. 10 is a cross-sectional view of the actuator according to a second embodiment cut at a second portion of a diaphragm.
Figure 11:
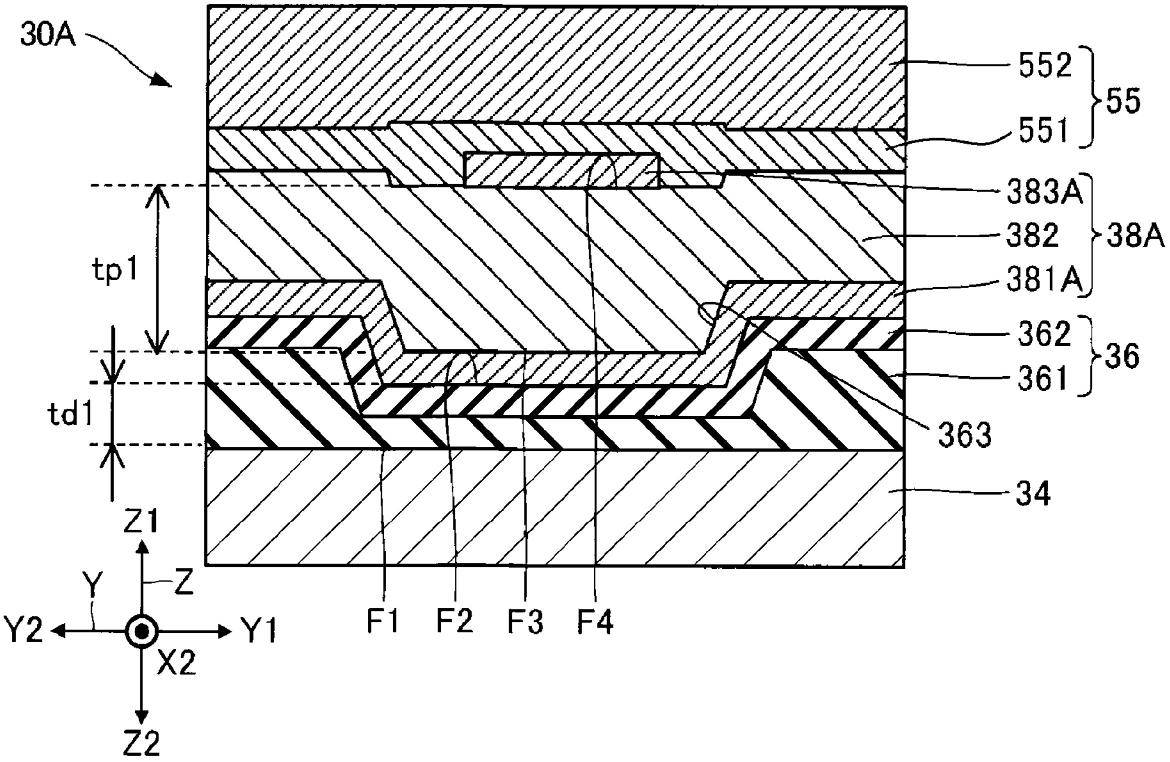
FIG. 11 is a cross-sectional view of the actuator according to the second embodiment cut at a first portion of a diaphragm.

FIG. 10 is a cross-sectional view of the actuator 30A according to the second embodiment cut at the second portion PA2 of the diaphragm 36. FIG. 11 is a cross-sectional view of the actuator 30A according to the second embodiment cut at the first portion PA1 of the diaphragm 36. The actuator 30A is the same as the actuator 30 of the first embodiment described above, except that a piezoelectric element 38A is provided instead of the piezoelectric element 38. The piezoelectric element 38A is the same as the piezoelectric element 38 except that a first electrode 381A and a second electrode 383A are provided instead of the first electrode 381 and the second electrode 383.

As illustrated in FIGS. 10 and 11, the first electrode 381A is a band-shaped common electrode extending in the direction along the Y axis so as to be continuous over the plurality of piezoelectric elements 38A. On the other hand, the second electrode 383A is an individual electrode disposed so as to be separated from each other for each piezoelectric element 38A. Here, as in the first embodiment described above, the thickness tp1 of the portion of the piezoelectric body 382 corresponding to the first portion PA1 is larger than the thickness tp2 of the portion of the piezoelectric body 382 corresponding to the second portion PA2.

The cracks in the piezoelectric body 382 can also be reduced by the above-mentioned second embodiment as in the above-mentioned first embodiment. In the present embodiment, the first electrode 381A is commonly provided for the plurality of pressure chambers C. On the other hand, the second electrode 383A is individually provided for the plurality of pressure chambers C. Therefore, the angle formed by the concave portions 363 formed on the second surface F2 of the diaphragm 36 is alleviated by being covered with the second electrode 383A. As a result, the stress concentration on the piezoelectric body 382 due to the angle can be reduced.

3. Third Embodiment

Hereinafter, a third embodiment of the present disclosure will be described. For the elements whose actions and functions are the same as those of the first embodiment in the embodiments illustrated below, the reference numerals used in the description of the first embodiment will be diverted and detailed description of each will be omitted as appropriate.

Figure 12:
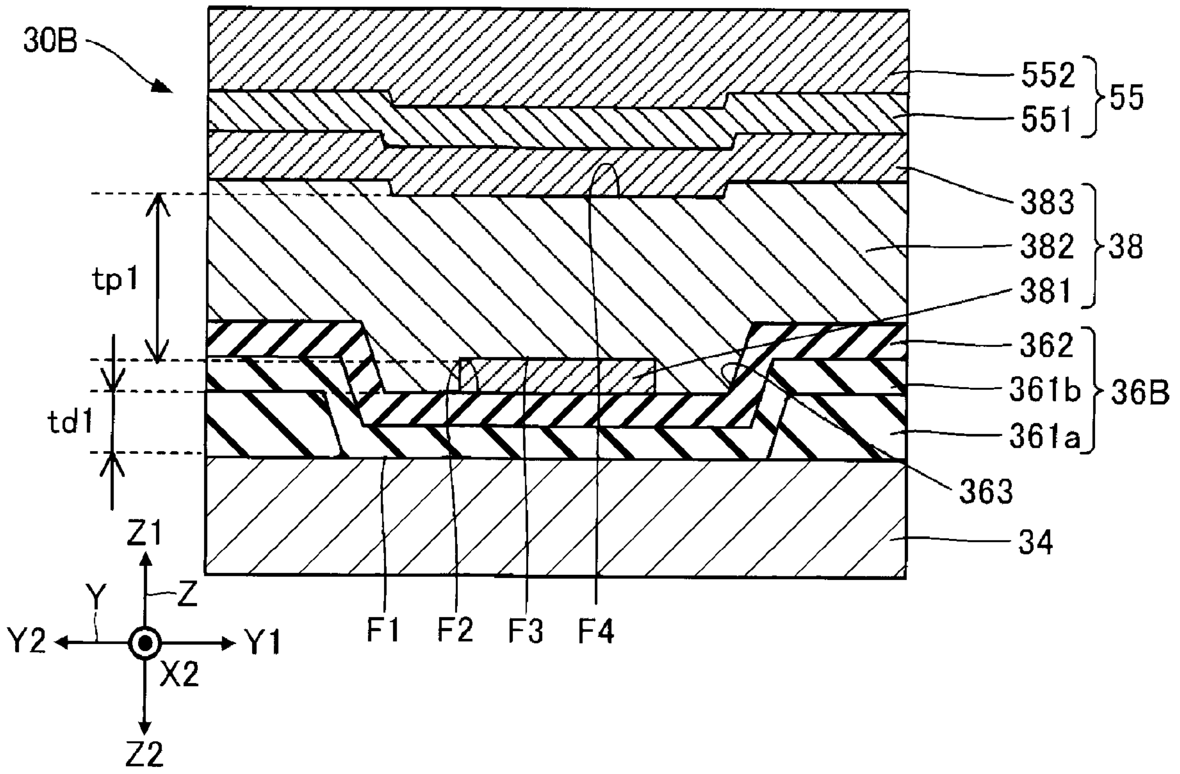
FIG. 12 is a cross-sectional view of an actuator according to a third embodiment cut at a first portion of a diaphragm.

FIG. 12 is a cross-sectional view of the actuator 30B according to the third embodiment cut at the first portion PA1 of the diaphragm 36B. The actuator 30B is the same as the actuator 30 of the first embodiment described above, except that the diaphragm 36B is provided instead of the diaphragm 36. The diaphragm 36B is the same as the diaphragm 36 except that a layer 361*a* and a layer 361*b* are provided instead of the first layer 361.

As illustrated in FIG. 12, the layers 361*a* and 361*b* are stacked in this order in the Z1 direction. Each of the layer 361*a* and the layer 361*b* is an elastic film made of silicon oxide ($SiO_2$), as in the case of the first layer 361 described above. However, the layer 361*a* is provided with an opening that penetrates the region corresponding to the first portion PA1. On the other hand, the layer 361*b* is provided with a uniform thickness. With such layers 361*a* and 361*b*, the concave portion 363 can be provided on the second surface F2 as in the first embodiment. Further, the layer 361*a* is formed by, for example, etching using the pressure chamber substrate 34 as an etching stop layer. The stack including the layer 361*a* and the layer 361*b* may be regarded as the “first layer”.

The cracks in the piezoelectric body 382 can also be reduced by the above-mentioned third embodiment as in the above-mentioned first embodiment. In the present embodiment, by forming the layer 361*a* by etching using the pressure chamber substrate 34 as the etching stop layer, the first portion PA1 can be formed as compared with the configuration using half etching as in the first embodiment.

4. Fourth Embodiment

Hereinafter, a fourth embodiment of the present disclosure will be described. For the elements whose actions and functions are the same as those of the first embodiment in the embodiments illustrated below, the reference numerals used in the description of the first embodiment will be diverted and detailed description of each will be omitted as appropriate.

Figure 13:
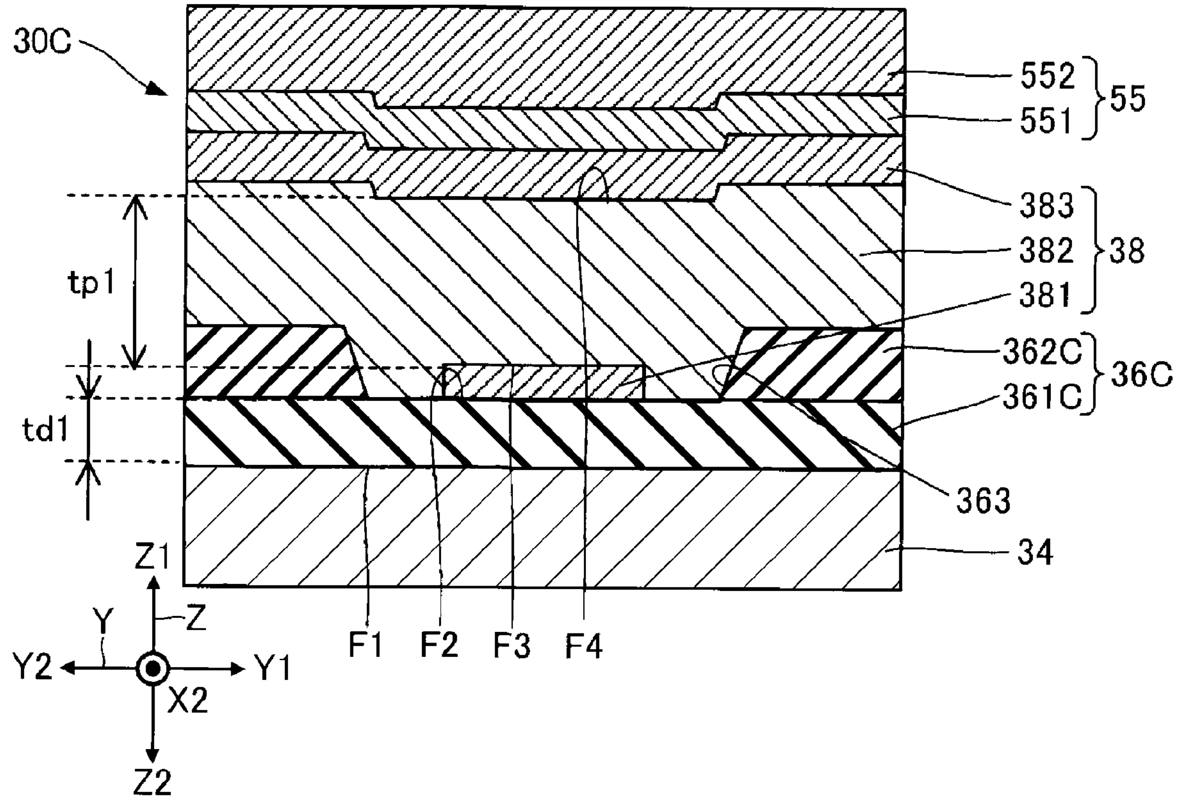
FIG. 13 is a cross-sectional view of an actuator according to a fourth embodiment cut at a first portion of a diaphragm.

FIG. 13 is a cross-sectional view of the actuator 30C according to the fourth embodiment cut at the first portion PA1 of the diaphragm 36C. The actuator 30C is the same as the actuator 30 of the first embodiment described above, except that the diaphragm 36C is provided instead of the diaphragm 36. The diaphragm 36C is the same as the diaphragm 36 except that the first layer 361C and the second layer 362C are provided instead of the first layer 361 and the second layer 362.

As illustrated in FIG. 12, the first layer 361C and the second layer 362C are stacked in this order in the Z1 direction. The first layer 361C is, for example, an elastic film made of silicon oxide ($SiO_2$) like the first layer 361 described above. However, the first layer 361C is provided with a uniform thickness. On the other hand, the second layer 362C is, for example, an insulating film made of silicon nitride (SiN). The second layer 362C is provided with an opening that penetrates the region corresponding to the first portion PA1. With such the first layer 361C and the second layer 362C, the concave portion 363 can be provided on the second surface F2 as in the first embodiment. Further, the second layer 362C is formed by, for example, etching using the first layer 361C as an etching stop layer.

The cracks in the piezoelectric body 382 can also be reduced by the above-mentioned fourth embodiment as in the above-mentioned first embodiment. In the present embodiment, by forming the second layer 362C by etching using the first layer 361C as the etching stop layer, the first portion PA1 can be formed as compared with the configuration using half etching as in the first embodiment.

5. Fifth Embodiment

Hereinafter, a fifth embodiment of the present disclosure will be described. For the elements whose actions and functions are the same as those of the first embodiment in the embodiments illustrated below, the reference numerals used in the description of the first embodiment will be diverted and detailed description of each will be omitted as appropriate.

Figure 14:
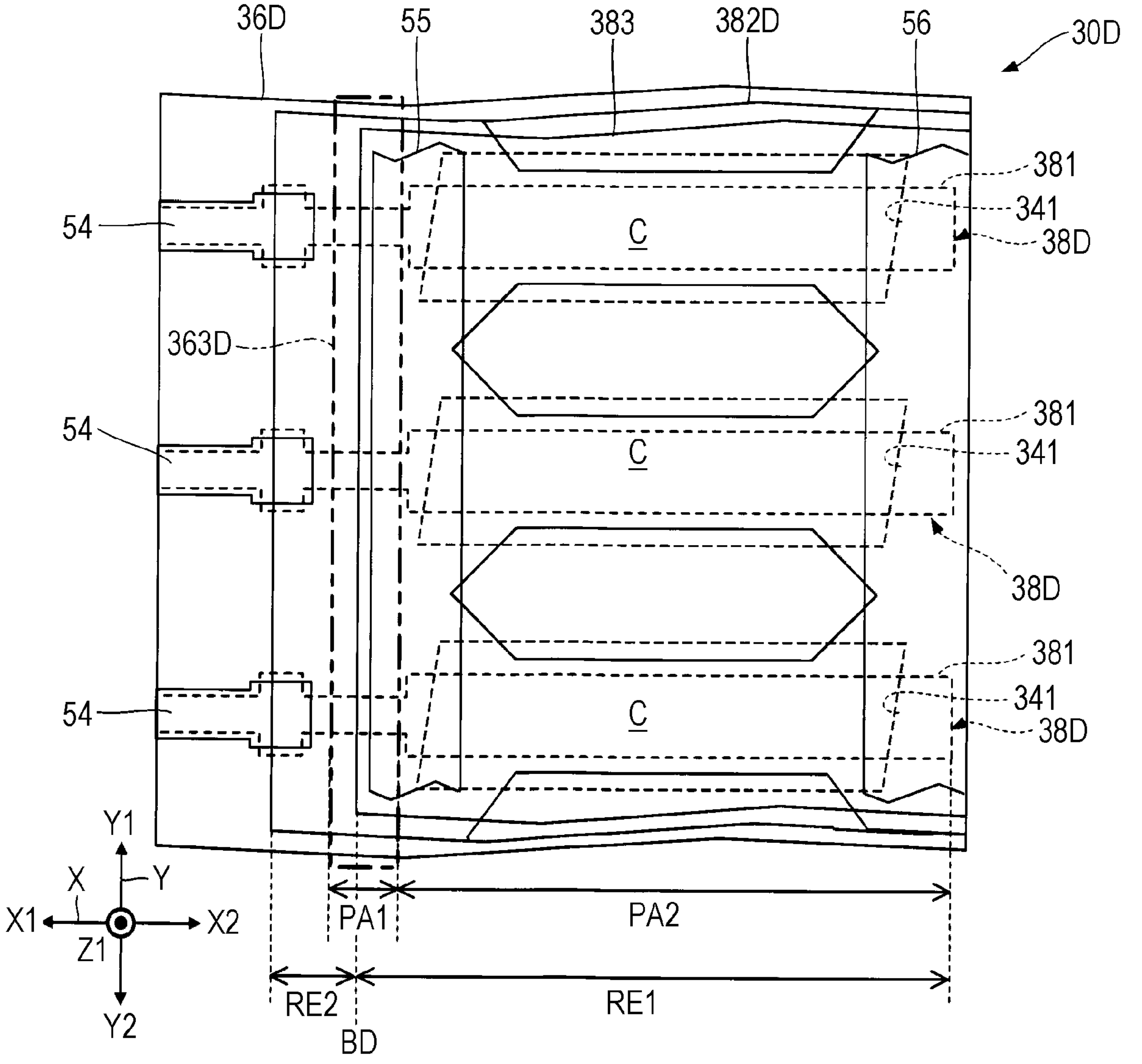
FIG. 14 is a plan view illustrating an actuator according to a fifth embodiment.

FIG. 14 is a plan view illustrating the actuator 30D according to the fifth embodiment. The actuator 30D is the same as the actuator 30 of the first embodiment described above, except that the shape of the first portion PA1 is different. The actuator 30D is the same as the above-described first embodiment except that the diaphragm 36D and the piezoelectric element 38D are provided instead of the diaphragm 36 and the piezoelectric element 38. The diaphragm 36D is the same as the diaphragm 36 except that a concave portion 363D is provided instead of the concave portion 363. The piezoelectric element 38D is the same as the piezoelectric element 38 except that a piezoelectric body 382D is provided instead of the piezoelectric body 382.

The first portion PA1 of the present embodiment is configured by providing a concave portion 383D as illustrated by the alternate long and two short dashes line in FIG. 14. Here, the first portion PA1 is provided in common with the plurality of first electrodes 381 and forms a band shape extending along the Y axis. The thickness of the portion of the piezoelectric body 382D corresponding to the first portion PA1 is thicker than the other portions of the piezoelectric body 382D.

The cracks in the piezoelectric body 382 can also be reduced by the above-mentioned fifth embodiment as in the above-mentioned first embodiment. In the present embodiment, since the position accuracy required for the first portion PA1 is lower than that in the configuration in which the first portion PA1 is individually provided for each first electrode 381 as in the first embodiment described above, the actuator 30D is easy to manufacture.

6. MODIFICATION EXAMPLES

The embodiments in the above examples can be variously modified. Specific modification aspects applicable to each of the above-mentioned embodiments are illustrated below. It should be noted that two or more aspects randomly selected from the following examples can be appropriately merged without contradicting each other.

6-1. Modification Example 1

In each of the above-described embodiments, a configuration in which the second region RE2 is located in the X1 direction with respect to the first region RE1 is exemplified, but the configuration is not limited thereto, and the second region RE2 may be located in the X2 direction with respect to the first region RE1. In this case, the first portion PA1 is located in the X2 direction with respect to the second portion PA2.

6-2. Modification Example 2

In the above-described embodiment, the configuration in which the actuator is mounted on the liquid discharge head is exemplified, but the device on which the actuator is mounted is not limited to the liquid discharge head, and may be another drive device such as a piezoelectric actuator, for example.

6-3. Modification Example 3

In the above-described embodiments, a configuration in which the piezoelectric body is interposed between the individual electrodes and the common electrode is exemplified, but the present disclosure is not limited thereto, and a piezoelectric body may be interposed between the individual electrodes.

6-4. Modification Example 4

In each of the above-described embodiments, the serial type liquid discharge device 100 for causing the transport body 242 to reciprocate on which the liquid discharge head 26 is mounted is exemplified, the present disclosure can also be applied to a line-type liquid discharge device in which a plurality of nozzles N are distributed over the entire width of the medium 12.

6-5. Modification Example 5

The liquid discharge device 100 illustrated in each of the above-described embodiments can be adopted in various devices such as a facsimile machine and a copier, in addition to a device dedicated to printing. The application of the liquid discharge device of the present disclosure is not limited to printing. For example, a three-dimensional object printing device that discharges a solution of a coloring material is used as a manufacturing apparatus that forms a color filter of a liquid crystal display device. A three-dimensional object printing device that discharges a solution of a conductive material is used as a manufacturing apparatus that forms a wiring and an electrode on a wiring substrate.

What is claimed is:

1. A liquid discharge head comprising: a diaphragm, a first electrode, a piezoelectric body, and a second electrode which are stacked in this order in a first direction, wherein when a region of the piezoelectric body interposed between the first electrode and the second electrode is set as a first region, a region of the piezoelectric body other than the first region is set as a second region, a portion of the diaphragm that overlaps a boundary between the first region and the second region when viewed in the first direction is set as a first portion, a portion of the diaphragm that is different from the first portion and overlaps the first region when viewed in the first direction is set as a second portion, and a portion of the diaphragm that is different from the first portion and overlaps the second region when viewed in the first direction is set as a third portion, a thickness of the first portion is smaller than a thickness of the second portion and a thickness of the third portion.

2. The liquid discharge head according to claim 1, wherein the diaphragm includes a first surface, and a second surface located in the first direction with respect to the first surface and opposite to the first surface, and the second surface of the first portion is located in a second direction opposite to the first direction with respect to the second surface of the second portion.

3. The liquid discharge head according to claim 1, wherein the diaphragm includes a first layer, and a second layer that is located in the first direction with respect to the first layer, and a thickness of the first layer of the first portion is smaller than a thickness of the first layer of the second portion.

4. The liquid discharge head according to claim 3, wherein a thickness of the second layer of the first portion is equal to a thickness of the second layer of the second portion.

5. The liquid discharge head according to claim 1, wherein a thickness of a portion of the piezoelectric body corresponding to the first portion is larger than a thickness of a portion the piezoelectric body corresponding to the second portion.

6. The liquid discharge head according to claim 5, wherein the piezoelectric body includes a third surface, and a fourth surface that is located in the first direction with respect to the third surface and opposite to the third surface, and a portion of the third surface corresponding to the first portion is located in a second direction opposite to the first direction with respect to a portion of the third surface corresponding to the second portion.

7. The liquid discharge head according to claim 6, wherein a portion of the fourth surface corresponding to the first portion is located in the second direction with respect to a portion of the fourth surface corresponding to the second portion.

8. The liquid discharge head according to claim 1, further comprising:

a pressure chamber substrate that is located in a second direction opposite to the first direction with respect to the diaphragm and partitions a plurality of pressure chambers to be arrayed, wherein the first portion and the second portion are adjacent to each other in a direction intersecting with respect to an array direction of the plurality of pressure chambers.

9. The liquid discharge head according to claim 8, wherein the first electrode is individually provided for the plurality of pressure chambers, and the second electrode is commonly provided for the plurality of pressure chambers.

10. The liquid discharge head according to claim 8, wherein the first electrode is commonly provided for the plurality of pressure chambers, and the second electrode is individually provided for the plurality of pressure chambers.

11. The liquid discharge head according to claim 8, wherein the first portion does not overlap the pressure chamber when viewed in the first direction.

12. A liquid discharge device comprising:

the liquid discharge head according to claim 1; and a controller that controls a liquid discharge operation by the liquid discharge head.

13. An actuator comprising a diaphragm, a first electrode, a piezoelectric body, and a second electrode which are stacked in this order in a first direction, wherein when a region of the piezoelectric body interposed between the first electrode and the second electrode is set as a first region, a region of the piezoelectric body other than the first region is set as a second region, a portion of the diaphragm that overlaps a boundary between the first region and the second region when viewed in the first direction is set as a first portion, a portion of the diaphragm that is different from the first portion and overlaps the first region when viewed in the first direction is set as a second portion, a portion of the diaphragm that is different from the first portion and overlaps the second region when viewed in the first direction is set as a third portion, and a thickness of the first portion is smaller than a thickness of the second portion and a thickness of the third portion.

14. The liquid discharge head according claim 1, wherein the portion of the diaphragm that overlaps the boundary between the first region and the second region, and includes a portion of the first region, the second region, and the boundary between the first region and the second region, when viewed in the first direction, is set as the first portion.

15. The liquid discharge head according to claim 1, wherein when the first region is elongate and extends in a second direction along a length of a pressure chamber, the region of the piezoelectric body other than the first region is set as the second region that extends in the second direction, and a thickness of the first portion in the first direction is smaller than a thickness of the second portion in the first direction and a thickness of the third portion in the first direction.

* * * * *